(No Model.)

I. H. JEWELL.
APPARATUS FOR CLEANING FILTERS.

No. 587,969. Patented Aug. 10, 1897.

Witnesses
Wm. M. Jewell
Evora Bellau

Inventor
Ira H. Jewell

UNITED STATES PATENT OFFICE.

IRA H. JEWELL, OF CHICAGO, ILLINOIS.

APPARATUS FOR CLEANING FILTERS.

SPECIFICATION forming part of Letters Patent No. 587,969, dated August 10, 1897.

Application filed November 7, 1892. Serial No. 451,163. (No model.)

*To all whom it may concern:*

Be it known that I, IRA H. JEWELL, of Chicago, in the county of Cook and State of Illinois, have invented certain new and useful Improvements in Apparatus for Cleaning Filters; and I do hereby declare that the following is a full, clear, and exact description thereof, reference being had to the accompanying drawings, forming a part of this specification.

My invention relates to apparatus for cleansing gravity-filters of large area as contradistinguished from filters of small area, in which latter the filtering material may be effectively cleaned by simply reversing the direction of flow of liquid through the filtering material.

The primary objects of my invention are to continuously and effectively cleanse and renovate successive portions of the filtering material without interrupting the operation of the filter as a whole and also to effectively cleanse and renovate the entire filtering-bed with but a brief interruption of the operation or process of filtration. By "gravity-filters" I mean a filter wherein the filtering material is placed in a suitable receptacle, the impure water, sewage, or the like is turned in upon the top of the filter-bed, percolates or filters by gravity down through the bed of filtering material, and is drained off at or near the bottom of the receptacle more or less freed of its impurities, the latter being retained upon or by the filtering material.

To the above purposes my invention consists in certain peculiar and novel features of construction and arrangement appertaining to apparatus for cleansing filters of the above character, all as hereinafter described and claimed.

The more precise nature of my invention will be better understood when described with reference to the accompanying drawings, in which—

Figure 1:
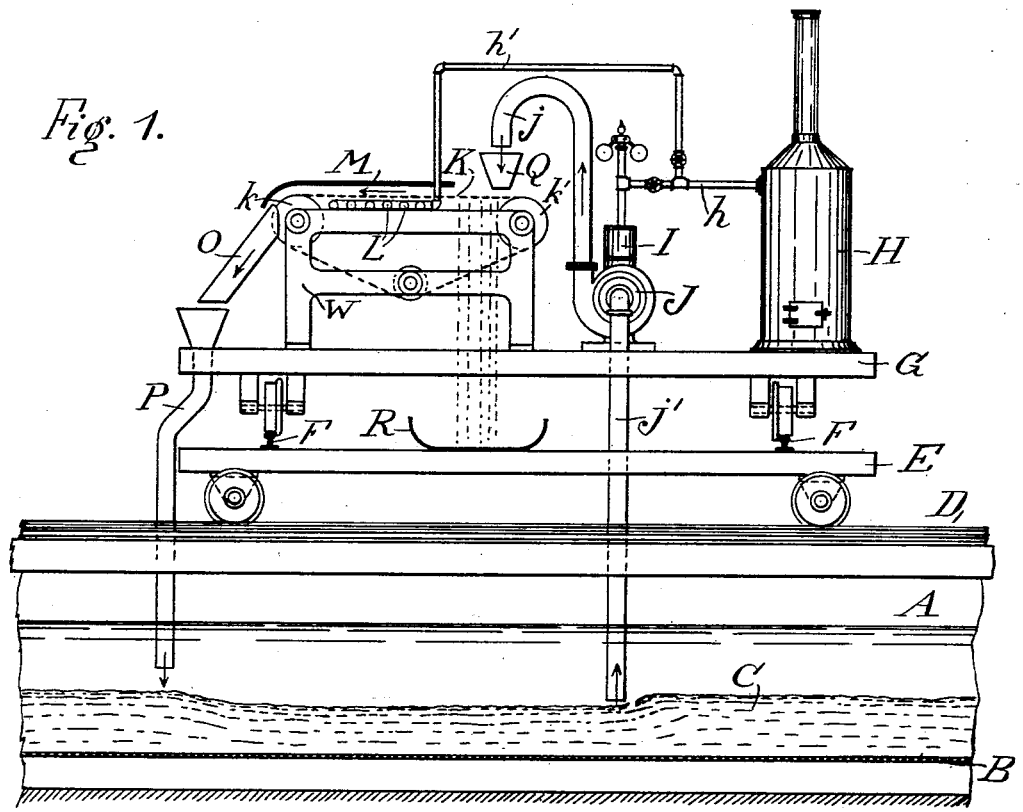
Figure 2:
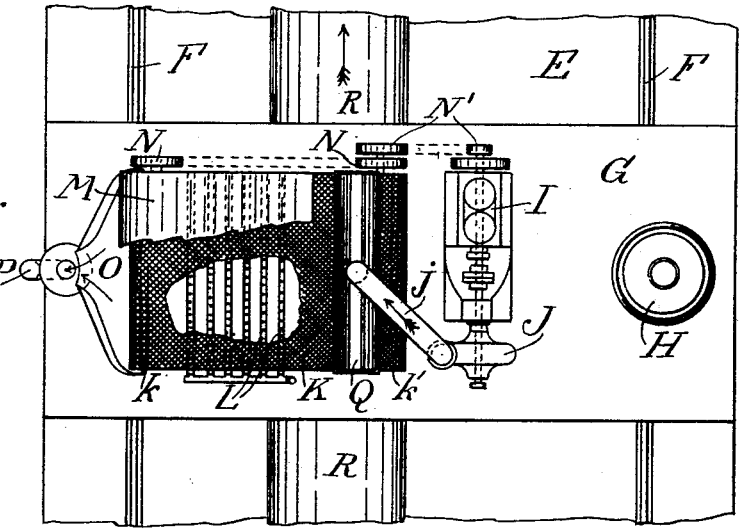

Figure 1 is a view in side elevation of an apparatus embodying my invention. Fig. 2 is a plan view of the same.

Filters of comparatively small area—say one hundred square feet or less—are readily and effectively cleansed by simply reversing the currents of liquid through the filtering material; but filtering-beds of large area—say from one hundred square feet to five thousand square feet of area—cannot generally be practically cleaned in such manner, owing principally to the enormous quantity of liquid which would be required in a short space of time for such purpose.

In practice it is found that in large filters of the character described the upper stratum of the filter-bed becomes filled with said impurities very rapidly, while the lower stratum remains comparatively clear for a relatively long period. Hence it is often necessary to clear the upper portion of the filter-bed more often than the lower portion thereof.

Usually filters of large area have been cleansed by skimming off the upper stratum of filtering material and removing it to an adjacent washing device or apparatus and then returning the cleansed material to the filtering-bed and spreading such material upon the bed. All such previous methods have, however, necessitated a stoppage of the general filtering operation as a whole, and it will be seen from the ensuing description that by use of my improved apparatus I have avoided such stoppage of the filtering action.

Referring to the drawings, A designates the walls or embankments of a filtering-basin, which is usually of oblong form and comparatively narrow. In the bottom of this basin is located a perforated bottom section B, which acts as a strainer and upon which rests the mass C of filtering material, such filtering material being quartz, sand, or any other suitable granular substance. Upon the tops of the walls A are laid track-rails D, upon which travels a wheeled platform E, and upon this platform are laid track-rails F, which extend at right angles to the rails D. A car or truck G runs upon the rails F and carries the motor and operative mechanisms, the relative movements of the wheeled platform and the truck enabling the apparatus to operate successively upon all parts of the filtering material. Upon the truck or car G is mounted a boiler H and an engine I, these being each of any suitable or preferred type and the engine being supplied with steam from the boiler through a steam-supply pipe $h$. To the engine I is suitably geared a suctionpump J, preferably of the fan type and resting upon the truck G. A suction-pipe $j'$ leads from the pump J downward to the upper part of the mass C of filtering material. A discharge-pipe $j$ leads from the pump J and delivers into a hopper Q, which is mounted above the screen K at the inner ends of a framework W, so as to discharge its contents upon said screen.

Upon the framework W, which rests upon the truck G, is mounted an endless horizontal revoluble screen K, of wire-cloth or other suitable material, this screen K extending over suitable rollers $k\ k'$, provided at their ends with belt-pulleys N. One of the rollers $k'$ is shown as carrying also a second pulley N', and the intention is to run a belt over the two pulleys N and a second belt over the pulley N' and over a similar pulley upon the engine-shaft, (both as indicated by dotted lines in Fig. 2,) so as to revolve the rollers and the screen from the engine-shaft. Obviously the screen may be geared to the engine in any other suitable manner, if preferred.

Below the screen K are placed a number of horizontal and perforated steam-pipes L, which are supported in the framework W and which are connected to the steam-supply pipe $h$ by a branch pipe $h'$. The upper lap of the screen K moves toward a hopper O, shown as supported in the adjacent end of the framework W, and thus delivers into said hopper. The hopper Q in turn delivers into the upper end of a spout or pipe P, which is carried by the adjacent end of the truck G, the upper end of this spout reaching just below the hopper O and its lower end extending down to the mass C of filtering material. A shield or guard M overlies the screen K and is supported by the framework W, the outer end of said shield being curved downward, so as to extend over the roller $k$ and to thus direct the material from the screen K to the hopper O. Beneath the screen K and pipes L is placed a trough R, which is supported upon the platform E and which extends transversely of the truck G, so as to deliver its contents at the sides of the filter-bed.

In the operation of the above-described apparatus the upper or dirtier portions of the filtering material C are drawn by the pump successively through the suction-pipe $j'$ together with portions of the unfiltered or supernatant water, (this water being shown by broken lines in Fig. 1.) The substances thus drawn up through the pipe $j'$ are discharged through the pipe $j$ into the hopper Q and are deposited by said hopper upon the revolving screen K. The water and impurities raised by the pump J pass through the screen K and fall into the trough R, by which they are conveyed into a suitable waste-conduit beside the filtering-basin. As the filtering material is moved by the screen K toward the hopper O the meshes of the screen K retain the filtering material upon the screen, so as to enable said screen to deliver the material into the hopper O. The separation of the water from the sand is effected very rapidly, so that by the time the sand has been carried above the steam-pipes L it holds only as much water as is retained by adhesion. At the same time the filtering material has been spread out and distributed over the screen to such an extent as to thoroughly aerate and oxygenate the same, thus simultaneously oxidating the adherent impure sludge and vitiating the germs therein. At this time steam may be discharged from the pipes L through the screen K and the sand or filtering material thereon, thus setting the filtering material into violent motion and permitting the steam to thoroughly permeate the material, thus heating the material to such a degree as to sterilize and destroy any micro-organisms which it may contain. After this steaming operation the filtering material is delivered to the hopper O and passes thence into the pipe P, through which it is delivered upon the top of the filtering material in the filtering-basin.

Although almost all of the impurities are collected upon the surface of the filtering-bed C some portions of such impurities will in time penetrate deeper into the bed, and consequently while the cleansing operations above described will usually effectively purify the bed the entire bed will have to be cleansed. This is accomplished by sinking the suction-pipe $j'$ to the proper depth by any suitable means, (not shown,) and during this operation the filtering action of the filter, or of any one walled section thereof, would have to be stopped. The usual cleansing operation above described does not, however, interfere with the filtering action, and it is to be observed that the steaming operation above described is not usually employed when cleansing only the upper stratum of the filtering-bed, but principally when cleansing the entire bed.

Having thus described my invention, what I claim as new therein, and desire to secure by Letters Patent, is—

1. An apparatus for continuously cleansing filter-beds of large area, comprising a pump for continuously lifting successive portions of the filter-bed and of the supernatant water and impurities, a screen for separating the water and impurities from the filtering material, a conduit for carrying off the water and impurities, and a conduit for receiving the cleansed filtering material from the screen and for delivering such material upon the filter-bed, substantially as described.

2. An apparatus for continuously cleansing filter-beds of large area, comprising a pump for continuously lifting successive portions of the filter-bed and of the supernatant water and impurities, a traveling screen for separating the water and impurities from the filtering material, a conduit for carrying off the water and impurities from the screen, perforated steam-pipes located beneath the screen, and a conduit for receiving the cleansed filtering material and for delivering said material upon the filter-bed, substantially as set forth.

3. An apparatus for continuously cleansing filter-beds of large area, comprising a wheeled platform, a wheeled truck mounted upon said platform and movable transversely to the direction of movement of the platform, a pump mounted upon the truck and serving to continuously lift portions of the filtering-bed and of the supernatant water and impurities, a screen also mounted upon the truck and receiving the discharge from the pump, a conduit for carrying off the water and impurities from the screen, and a conduit for receiving the cleansed filtering material from the screen and delivering such material upon the filter-bed; both conduits being mounted upon the truck, all substantially as set forth.

4. An apparatus for continuously cleansing the beds of gravity-filters of large area, comprising a movable platform, a truck movably mounted thereon and adapted to travel transversely to the direction of movement of said platform, a lifting apparatus mounted on the truck for continuously lifting portions of the upper stratum of the filter-bed, mechanism, also located on the truck, for continuously separating the supernatant water and impurities from the material lifted and means for redepositing the cleansed material upon the filter-bed, substantially as described.

5. An apparatus for continuously cleansing filter-beds of large area, comprising a traveling platform, a truck mounted thereon and adapted to traverse said platform, an elevating apparatus mounted on said truck, adapted to raise successive portions of the filter-bed, an endless traveling screen adapted to receive said elevated material and separate the liquid from sludge and impurities, and a system of sterilizing-pipes located upon said truck adjacent to said screen and adapted to convey steam or other sterilizing agent, whereby the filtering material carried over said screen is sterilized, and means for redepositing the cleansed and sterilized material, substantially as described.

6. An apparatus for continuously cleansing the beds of gravity-filters of large area comprising a movable platform, a lifting device mounted thereon for continuously raising portions of the upper or superficial stratum of the filtering material, mechanism substantially as described for simultaneously cleansing said raised portions of the filtering material while separated from the filter-bed, and a conduit whereby the cleansed material may be redeposited upon the filter-bed, substantially as described.

IRA H. JEWELL.

Witnesses:
WM. M. JEWELL,
EVORA BELLAW.